United States Patent [19]

Holt

[11] Patent Number: 4,695,142
[45] Date of Patent: Sep. 22, 1987

[54] AUTOMATIC PHOTO IMAGING SYSTEM
[75] Inventor: David R. Holt, Rockford, Ill.
[73] Assignee: Harold A. Williamson, Rockford, Ill.
[21] Appl. No.: 758,786
[22] Filed: Jul. 25, 1985
[51] Int. Cl.$^4$ .................. G03B 29/00; G01D 9/42; G03G 21/00
[52] U.S. Cl. ..................... 354/76; 346/110 R; 355/3 SH
[58] Field of Search ........... 354/76, 83, 120; 346/110 R; 358/244; 355/3 SH, 20, 27

[56] References Cited
U.S. PATENT DOCUMENTS

| | | | |
|---|---|---|---|
| 2,748,651 | 6/1956 | Simjian | 354/76 X |
| 3,507,575 | 4/1970 | Soule et al. | 358/244 X |
| 4,027,315 | 5/1977 | Barney | 354/76 |
| 4,285,587 | 8/1981 | Schiff et al. | 346/110 R X |
| 4,343,543 | 8/1982 | Schiff et al. | 346/110 R X |
| 4,568,172 | 2/1986 | Acquaviva | 355/3 SH X |

Primary Examiner—Donald A. Griffin

[57] ABSTRACT

This invention is directed to an automatic photo imagery system wherein there is provide a multiple image single film sheet capability that employs a single degree of freedom, remotely controlled, moveable lens/shutter projection unit in combination with a film sheet transport apparatus that delivers single film sheets in a continuous manner past a projection unit while the projection unit moves in an incremental fashion back and forth across a film sheet path along which the single film sheets move.

21 Claims, 15 Drawing Figures

AUTOMATIC PHOTO IMAGING SYSTEM

TECHNICAL FIELD

This invention relates to an automatic photo imaging system employing multiple single sheet film.

BACKGROUND ART

Ever since the invention of the cathrod ray tube or video tube as it is commonly called today, there has been a recognition that images that appear thereon are transitory and that frequently there is more information or intelligence in the video image than can be discerned by a momentary study thereof before a fresh image presenting new information appears on the tube.

The solution to the problems of the transitory nature of video image is simply to take a photograph of the video image and then study the same later. The evolution of the photographic process has been as one would expect from very simple to highly complex.

Typical of the simplest approach is that shown in the McGroth U.S. Pat. No. 4,001,847 which simply provides a camera having an opening adjacent a lens such that the opening is sized to mate with an oscilloscope screen. The camera of Groth is also provided with a single film sheet film cassette. The McGroth approach provides a single image on a single film sheet.

There followed McGroth, in an evolutionary manner the idea of a multiple-image oscilloscope camera which is typified by the Yasillo U.S. Pat. No. 4,103,310. Yasillo provides for the placement of a plurality of images at selected locations on a single sheet of film by means of a stepping motor coupled to a rotating mirror and lens. Rotation of the mirror resulted in the deflection of an image to a desired location on the sheet of film.

In the field of medical science and the diagnositc study of the human body, the advent and development of scanning devices such as a gama ray, utltrasonic, and computerized tomographic images of x-ray irradiation, to name a few, have brought about the need for a dozen or more images to be provided on a single sheet of film.

To meet the need of multiple imaging just noted a number of technical approaches have been conceived and implemented, each one of which is significantly more complex than the invention to be described hereinafter.

In the Barney U.S. Pat. No. 4,240,729 the positioning of the image on the film is determined by the vertical and lateral positioning of a lens relative to perpendicular x and y axes corresponding to the length and width of the film. The lens is provided with a shutter for controlling the passage of light there through, and a pair of reversing electric motors are provided for selectively positioning the lens along the x and y axes.

The Fermaglech et al U.S. Pat. No. 4,174,895 which presents its invention as an improvement over the complex universally moveable lens moving arrangement of the type shown in the Barney patent just reviewed, provides for a multiple of differently strategically positioned lenses that are operationally available and are separately selected for operation based on position to correspondingly provide an appropriately positioned image on a film sheet.

The current state-of-the art appears to be best represented by Japanese Pat. No. 0060937 issued May 8, 1980 in which patent the idea of multiple, diffently strategically position lenses in a fixed array has combined therewith the idea of a moveable video tube in cooperation with the fixed array.

The invention to be described hereinafter advances the art further by doing away with the need for multiple lens arrays of Fermaglech et al and the Japanese Patent or the complex universally moveable lens apparatus of Barney while simultaneously reducing complexity, size and weight and providing multiple image capability for a single sheet film that matches in all respects and exceeds in yet other ways that which has been done before.

In conjunction with the heretofore noted problems that are attendant to automatic multi-photo imaging systems is that of providing single sheets of film into the system.

It has long been recognized that it is desireable to have a source of single film sheets stored in a film pack cassettes or magazine where the magazine may be inserted into a camera or other controlled film exposure device.

There have been many notable contributions to the this art typical of which is that shown in the Whall U.S. Pat. No. 3,650,188; Erlichman, U.S. Pat. No. 3,687,032 and Columbus, U.S. Pat. No. 4,283,134. A feature common to film packs, cassettes or magazines of the type described in the patents has been the need to provide a biasing means usually in the form of a spring element positioned beneath a stack of single film sheets to thereby urge the stack of film sheets in a direction that ensures the next, single film sheet to be removed is in position to be fed into the camera. In the Whall patent this feature is best seen in FIG. 7 where an unreference bow spring is shown positioned beneath a stack of film. In the Erlichman patent the film biasing means 96, 112, 114, 122, 126 and 134 is best observed in FIG. 8 of the patent's drawings.

The Columbus film pack is likewise provided with a film biasing means in the form of a complex spring member 36 best seen in FIG. 5 of the patent.

The Tomato U.S. Pat. No. 4,206,465 and Japanese Pat. No. 006937 illustrate a multi sheet film cassette in which there is no spring biased means beneath the stack of film sheets but as can be seen in both of these patents a complex vacuum pickup head arrangement is called for to remove the single film sheets.

In contrast to the prior art described above the multi-sheet film magazines of this invention requires no film stack biasing member nor does the magazine of this invention require vacuum devices to lift single film sheets.

DISCLOSURE OF INVENTION

To be more specific, this invention relates to an automatic photo imaging system that employs single sheet film. The basic system is comprised of two components, namely a single sheet film transport apparatus and a video monitor projection unit.

The single sheet film transport apparatus is operative to receive single sheets of film and mechanically deliver a single sheet along a film sheet production path to a first film image exposure row position. The image exposure row is at right angles to film path.

The film transport apparatus is provided with a switch that detects the arrival of the film sheet when the film sheet is adjacent the first film exposure row position and then causes the film sheet to stop its movement along the film path.

A video monitor projection unit is mounted for movement at right angles to the film sheet path. The projection unit includes a video monitor tube coupled by a projection conduit having one open end secured to the video monitor and configured to match the video monitor. The projection conduit other end is open and is positioned immediately adjacent the film path. The other open end of the projection conduit is configued to match the boundries of an image to be projected upon the film sheet.

The projection conduit has internally, intermediate its ends a single lens and shutter that is remotely controlled.

A drive unit is mechanically coupled to the video monitor projection unit to propel the projection unit in an incremental movement fashion, back and forth motion across the film sheet in a single degree of freedom path to thereby establish a first row of images across the fim sheet. The actuation of the remotely controlled lens/shutter occurs prior to or after each incremental movement of the video monitor projection unit.

The film transport apparatus further includes a mechanism to advance the film sheet along the film sheet path to thereby present to the projection conduit's other open end the unexposed film and thereby establish another row of possible images across the sheet of film by the use of a single lens moveable in a single degree of freedom path.

The invention also contemplates that there will be provided in combination with that which has been described next above a novel multi-sheet film cassette or magazine.

The multi sheet film magazine is fashioned of light tight chamber having an overall configuration which approximates a stack of single film sheets. A film sheet exit end of the chamber is provided with a sequentially actuateable pair of chamber end cover shields. The first of the sequentially actuable shields is pivotally mounted on a wall of the chamber and biased into a position that ensures that the chamber remains light tight when the magazine is not employed in the automatic photo imaging system described hereinbefore. The first of the sequentially actuateable shields is provide with cam elements that extend from the first shield in a manner that allows their mechanical engagement of a film transport apparatus as the magazine is brought into cooperation with the system. The engagement of the cam elements results in the pivotal movement of the first shield from a light tight or closed condition to an open position that will result in the film sheets being presented in a plane that is coincident with the beginning of the film sheet path of the automatic photo imagery system.

The other end cover shield is positioned for movement in a plane parallel to the film sheet stack and is reciprocatingly moveable from a closed position to an open position such that when the other cover shield is in the open position the automatic photo imagery system film transport apparatus will mechanically cooperate with the stacked film sheets and deliver the same into the film sheet path for automatic exposure in the system.

It is therefore a primary object of this invention to provide an automatic photo imagery system wherein there is provided a multiple image single film sheet capability that employs a single degree of freedom, remotely controlled, moveable lens/shutter projection unit in combination with a film sheet transport apparatus that delivers single film sheets in a continuous manner past a projection unit while the projection unit moves in an incremental fashion back and forth across a film sheet path along which the single film sheets move.

Another object of this invention to provide an automatic photo imagery system which mechanically and in a continuous positive drive manner delivers single film sheets from a multiple film sheet magazine to and through the automatic imaging system and a film developer to deliver a finished fully developed multi-image per sheet film ready for immediate use.

Yet another object of the invention of this specification is that of an improved multiple single film sheet magazine that is free from the need of providing any mechanism or means to bias or position stacked single film sheets or other complex film sheet lifting devices such that single film sheets are positioned ready for use in a camera or other controlled film exposure device.

In the attainment of the foregoing objects, the invention contemplates in its most comprehensive embodiment a multiple, single sheet film handling apparatus and system that provides multiple automatic photo imaging on a single film sheet while additionally automatically providing developed multiple images on a single sheet of film. The apparatus and system is composed of a multiple film sheet magazine unit which may take the form of multiple individual magazines each capable of carrying a supply of different size film sheets.

A single sheet film transport apparatus is operatively coupled to the multiple film sheet magazine unit to mechanically deliver a single sheet of film along a film sheet path from the magazine unit to a position adjacent a multiple apertured image boundry defining device positioned at right angles to the film sheet path.

The film transport apparatus includes a power driven roller arrangement which cooperates with the single film sheet. More specifically the power driven roller arrangement has a single power driven roller in driving contact with a top most single film sheet in one of the magazine units and a pair of power driven rollers between which the single film sheet is delivered and then is driven along the film sheet path. Each of the pair of power driven rollers have a roller diameter that is larger than the diameter of the single power driven roller to thereby ensure that the single film sheet velocity is increased when a single film sheet is under the driving influence of the pair of power driven rollers. The driving roller diameter difference causes the single film sheets to be separated along the film path.

Of special significance to the smooth movement and operation of the film sheets from the magazine resides in the single power driven roller being mounted for movement along a line that intersects a surface of a single film sheet of the stacked film sheets in magazine unit. The single power driven roller is biased towards the surface of the top most single sheet of the stack to thereby cause the single power driven roller to frictionally engage the surface of the single film sheet and cause the single film sheet to slide upon the next single film sheet in the stack and be delivered into the film path.

The magazine and consequently the stack of film is positioned at a load angle with respect to the film path when the film path is coincident with the film sheet and the film sheet is in a film exposure row position.

The film transport apparatus has a switch which is actuated to detect the arrival of a leading edge of the film sheet along the film sheet path when the film sheet is adjacent the image boundry defining device. Actuation of the switch causes the film sheet to stop its movement along the path.

A video monitor projection unit is mounted for movement at right angles to the film sheet path. The video monitor projection unit includes a video monitor tube coupled by a projection conduit which has one open end secured to the video monitor and configured to match the face of the video monitor tube. The other open end of the projection conduit is positioned adjacent the image boundry defining device and is configured to match the apertures in the image boundry defining device.

The projection conduit has therein a remotely controlled lens/shutter arrangement. The shutter operates only when the other open conduit end is directly adjacent, in matching relationship an aperture of the image boundry defining device.

The video monitor projection unit is provide with a driving motor to move the projection unit incrementally from aperture to aperture and back in a single degree of freedom path to thereby establish across the film sheet a row of descrete images.

The film transport apparatus is provided with a control unit which control unit functions to cause a film sheet to advance a predetermined distance and then stop. The predetermined distance being sufficient to deliver unexposed film to a position coincident with the image boundry defining device and thereby establish another row of possible images across the sheet of film.

The film transport apparatus is additionally provided with a film sheet departure switch the actuation of which is brought about by the passage of a trailing edge of a film sheet and the completion of a last row of images on the film sheet. The actuation of the departure switch also causes another single film sheet to be delivered by the film transport apparatus from the magazine while simultaneously causing an exposed film sheet to be mechanically driven into an automatic film developing unit from which emerge developed multi image single film sheets ready for diagnostic use.

Other objects and advantages of the present invention will be apparent upon reference to the accompanying description taken in conjunction with the following drawings.

BRIEF DESCRIPTION OF THE DRAWINGS

FIG. 1a is a view taken from the line 1a—1a in FIG. 1.

FIG. 7a illustrates a three dimensional manner the specific details of the populsion mechanism of FIG. 7, FIGS. 8, 9 and 10 illustrate in three dimensional form the multi sheet film magazine in various operative states.

DESCRIPTION OF THE PREFERRED EMBODIMENTS

Figure 1:
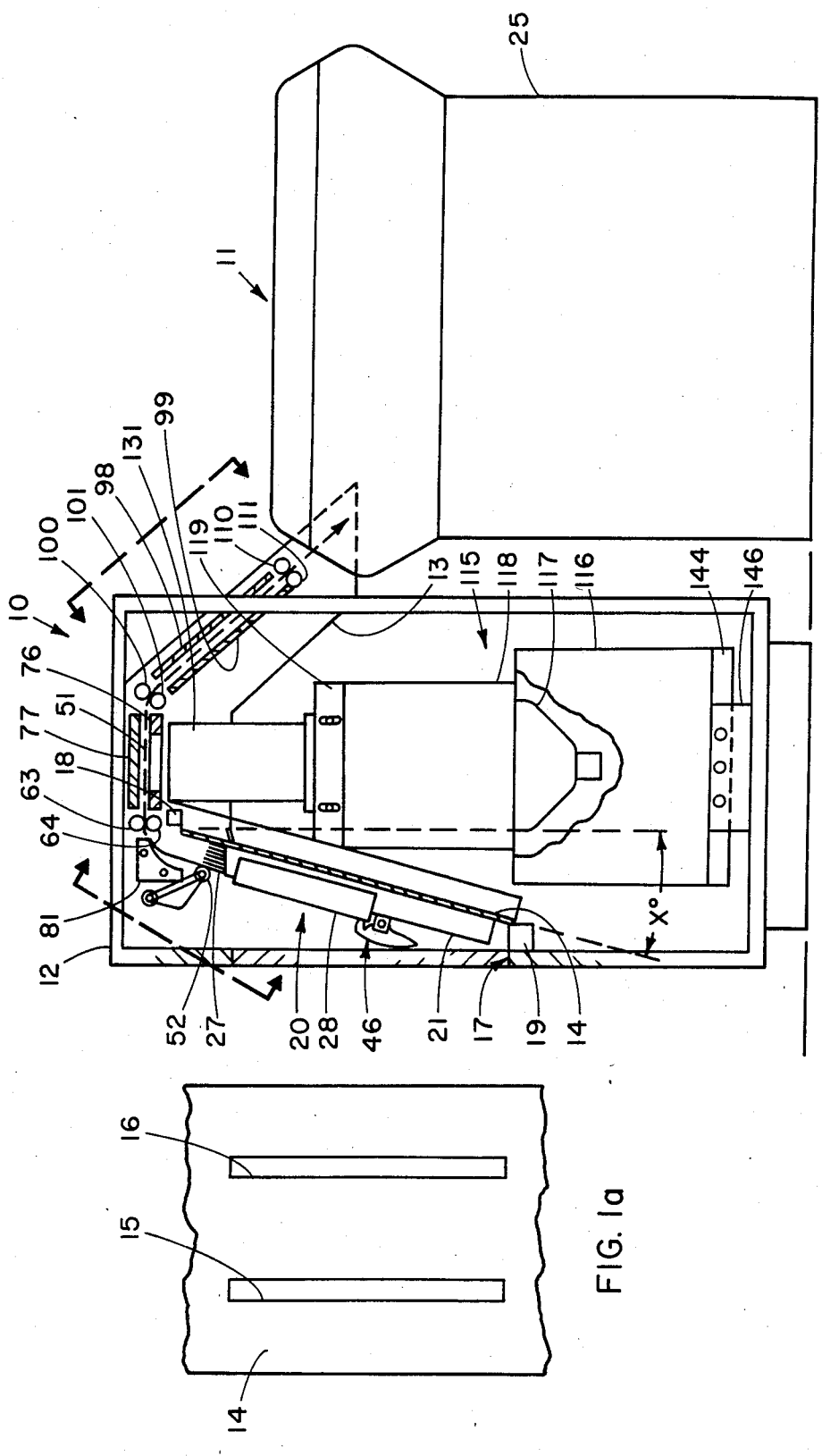
FIG. 1 is a schematic view in partial section which illustrates the relationship between the various components of the automatic photo imaging system emboding the invention.

Reference is now made to FIG. 1 which is a schematic view in partial section which illustrates the relationship between the various major components of the automatic photo imaging and photo developing system 10 embodying the invention.

A full and complete understanding of the invention will, however, require that reference be made from time to time to the remaining figures. These remaining figures which are provided in three dimensional form will quickly enhance the readers understanding of the dynamic cooperation of the details of the major components of the system.

Figures 2, 2A:
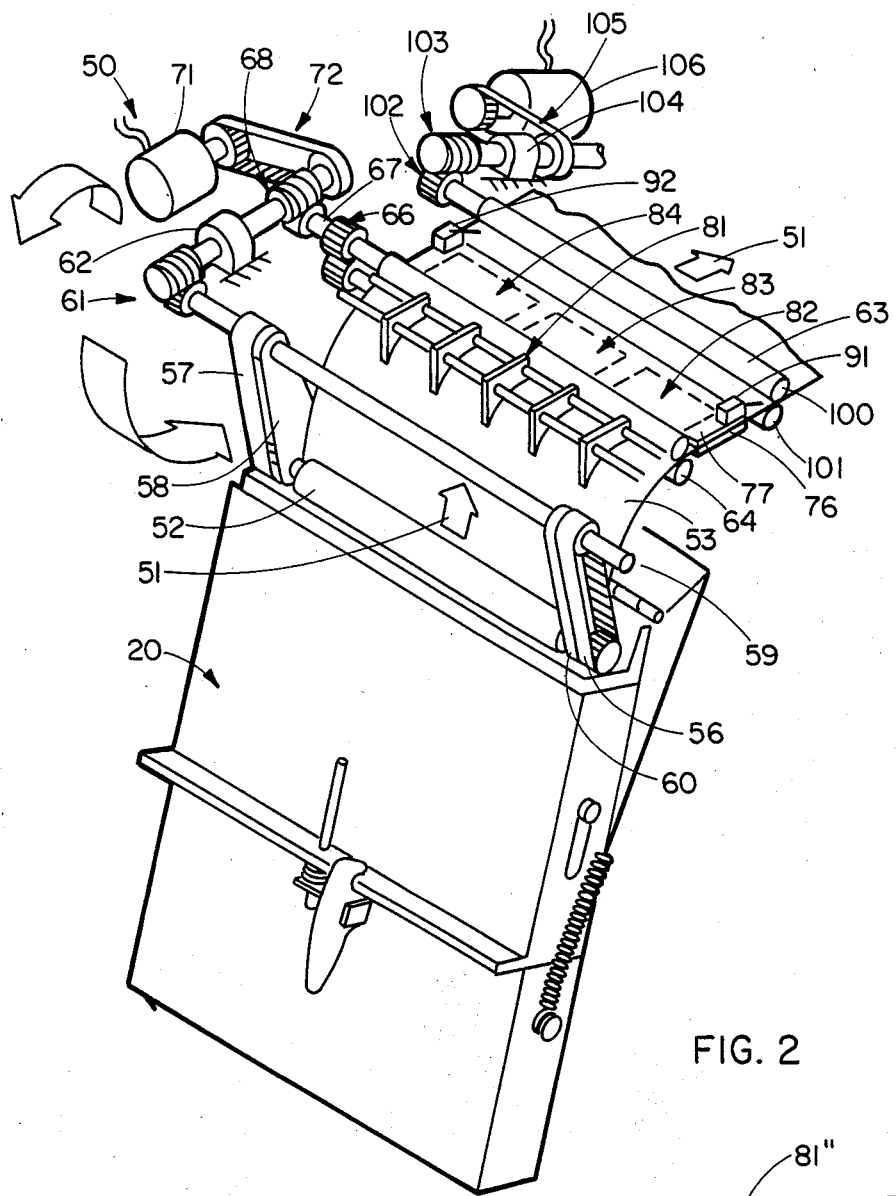
FIG. 2 is a three dimensional view taken from the general perspective indicated by line 2—2 in FIG. 1 and shows the physical cooperation of multi sheet film magazine and a portion of a film transport apparatus.
FIG. 2a illustrates schematically a multiple film sheet magazine to provide film sheets of different sizes.
Figure 7:
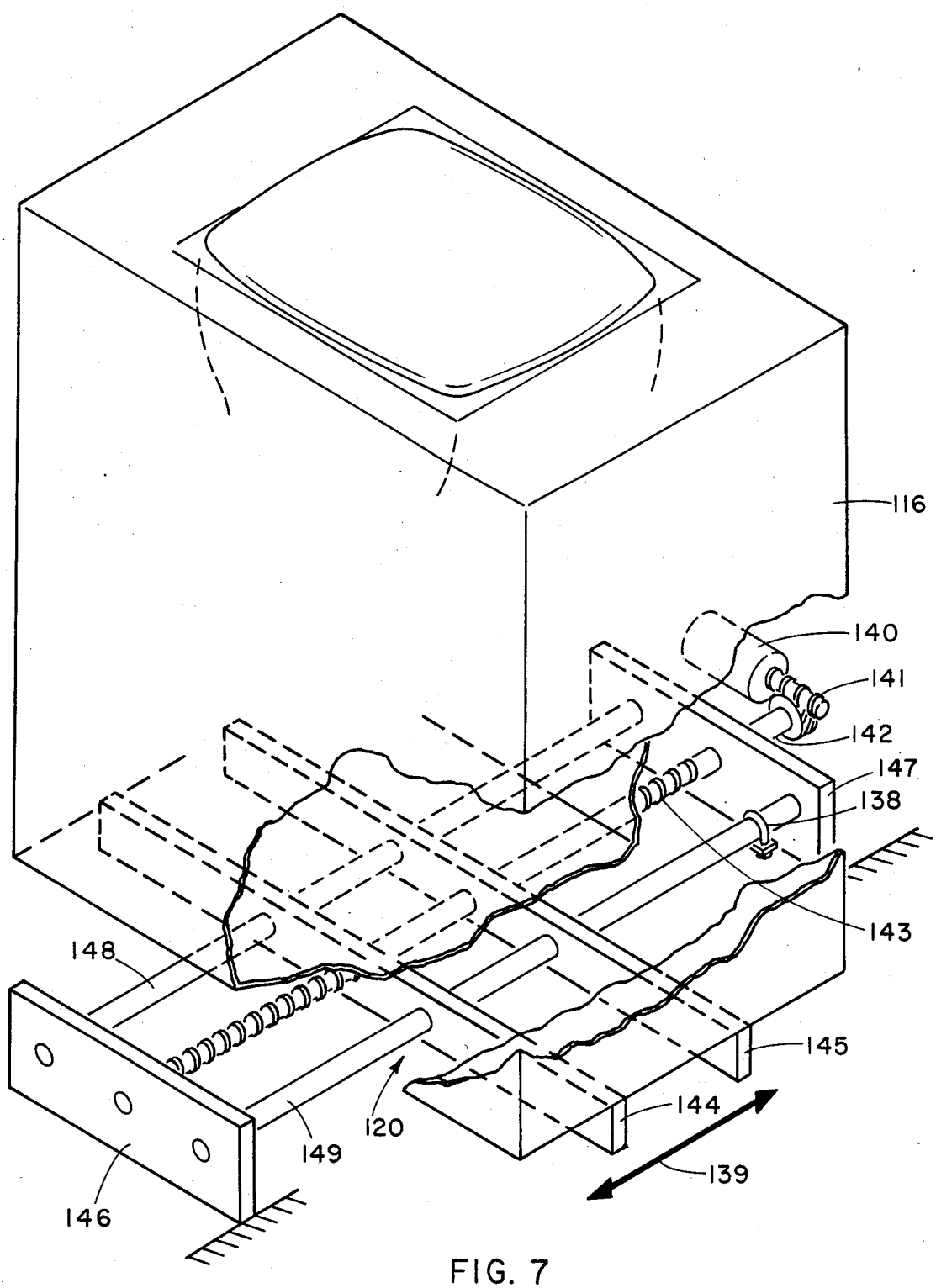
FIG. 7 is a three dimensional illustration of a video monitor projection unit, its propulsion mechanism and its cooperative relationship with the film transport apparatus.

A study of FIGS. 1, 2 and 7 reveals four major components of the system embodying the invention, namely, a multiple film sheet magazine or cassette 20 (FIG. 1) a single sheet film transport apparatus 50 (FIG. 2), a video monitor projecticn unit 115 (FIG. 7), and an automatic film developer 11 (FIG. 1).

Figure 8:
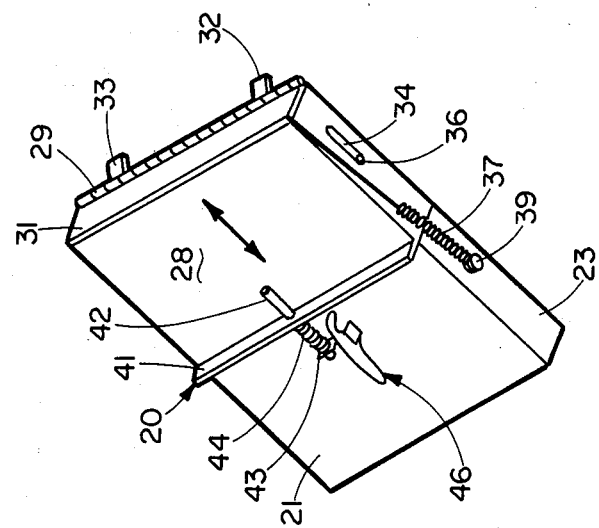
Figure 9:
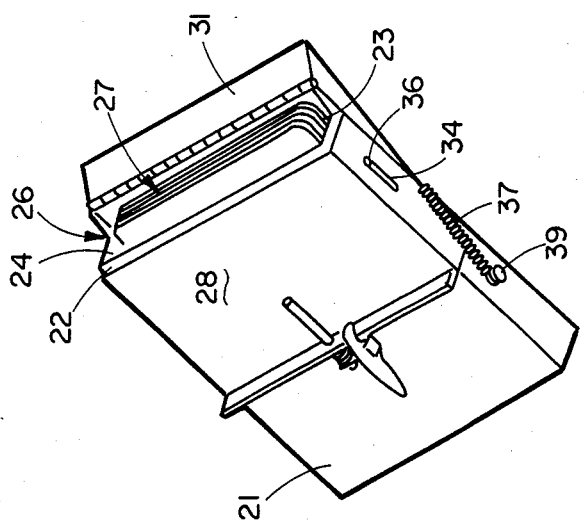
Figure 10:
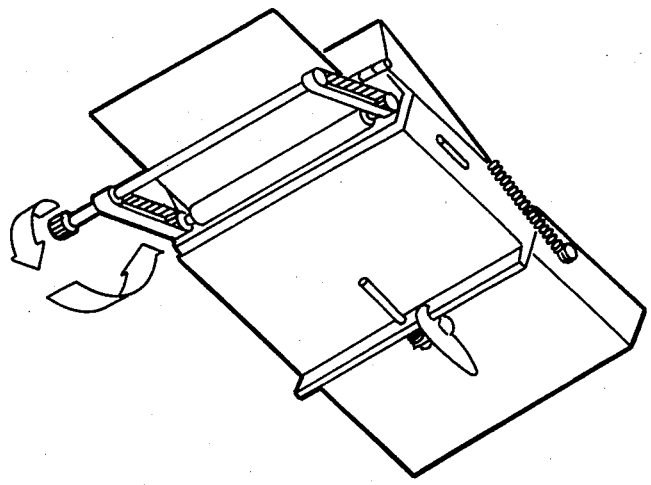

The embodiment of the invention of FIGS. 1 to 12 contemplate the use of single, multi-film sheet magazine 20 to be discussed more fully with respect to the illustrations of FIGS. 8, 9 and 10.

With specific reference now to FIG. 1 the magazine 20 with a multi-film sheet stack of unexposed film 27 is shown within a light tight cabinet 30 which has a frame 12 shown surrounding an inside perimeter of the cabinet 30. Cross support channels 18, 19 have secured there to, by means of fasteners not shown, a magazine support plate 14. The cross support framing channel 18 is secured to and positioned between a pair of spaced apart film transport apparatus support frames, one frame 13 of which is shown in FIG. 1.

The magazine support plate 14 is provided with a pair of cam slots 15, 16, configured and positioned as shown in FIG. 1a . The cam slots 15, 16 cooperate with cam elements 3Z and 33 of the magazine 20 which are best seen in FIG. 8. In FIG. 1 only one cam element, namely, cam element 32 can be seen. The function of cam slots 15, 16 and cam elements 32, 33 will be explained more fully hereinafter when the operation of the magazine 20 is described completely.

It is to be noted that there is provided a door opening 17 through which the magazine 20 is loaded into the system. The door that covers the opening 17 is not shown and may be any one of a variety of commercially available constructions.

In direct contact with the top surface of the stack of film sheets 27 there is shown a power driven roller 52 which frictionally engages the top most sheet of film in the stack 27. The power driven roller 52 is a part of the single sheet film transport apparatus 50 noted earlier. The manner in which the power driven roller 52 receives power can best be appreciated by studying FIG.

2 where it will be observed that the power driven roller 52 is shown engaging and delivering a single sheet of film 53 from the magazine 20. The power driven roller 52 is supported for rotary movement at opposite ends thereof by pivot arms 58 and 60. A pair of drive belts 56, 57 couple in the manner shown, a drive shaft 59 with the power driven roller 52. The drive shaft 59, in turn, receives power from an electric motor 71, through a first worm gear arrangment 61 and belt and pulley combination 72 coupled to the motor 71 in the manner shown. The drive shaft 59 is supported near its ends on the pair of spaced apart film transport support frames, one frame 13 of which is shown in FIG. 1.

The single sheets of film upon leaving the magazine 20 enters a film sheet path 51 which has its origin in the magazine 20 and its termination within the automatic film developer 11. The film sheet path 51 is shown in a broken line fashion with an arrow head superimposed on the broken line at points along the film path 51. In FIG. 2 and subsequent figures the film path is indicated with three dimensional arrows 51 dispersed at points along the film path.

In FIG. 1, positioned to the right and above the magazine 20 is film deflection guide 81. The film deflection guide 81 is secured near its ends on the pair of spaced apart parallel film transport support frames, one frame 13 of which is shown in FIG. 1. As the single sheet of film 53 is mechanically frictionally driven upward under the rotary driving action of power driven roller 52, the film sheet 53 strikes the curved surfaces provided by the film deflection guide 81 and is deflected precisely into a roller engagement region of power driven rollers 63 and 64.

Returning to FIG. 2 it will be observed that the power drivens rollers 63 and 64 are provided with a meshing gear set 66. A gear secured for rotation with each of the rollers 63, 64 ensure that when power is delivered via drive shaft 67 through the second worn gear arrangement 68, the belt and pulley arrangement 72 from the electric motor 71, the rollers 63, 64 will rotate in unison. While not shown in the drawings it is to be understood that a gear similar to gear set 66 is also normally provided at the opposite ends of power driven rollers 63, 64.

Reference is now made to FIG. 2a which depicts another embodiment of a multiple film sheet magazine means positioned to present a supply of single sheet film to power driven rollers 63, 64 of the film transport apparatus. FIG. 2a shows a pair of multiple film sheet magazines 20', 20" which are supported on magazine support plates 14', 14". Power driven rollers 52', 52" cooperate with stocks of different sizes film sheets 27', 27". When rollers 52', 52" are selectively driven in the manner, for example, as shown in FIG. 2 different sized individual sheets of film are deliver from the magazines 20', 20" where upon they engage a lower surface of film deflection guide 81' or 81" which inturn delivers the film sheet to power driven rollers 63, 64 of the film transport apparatus.

Figure 3:
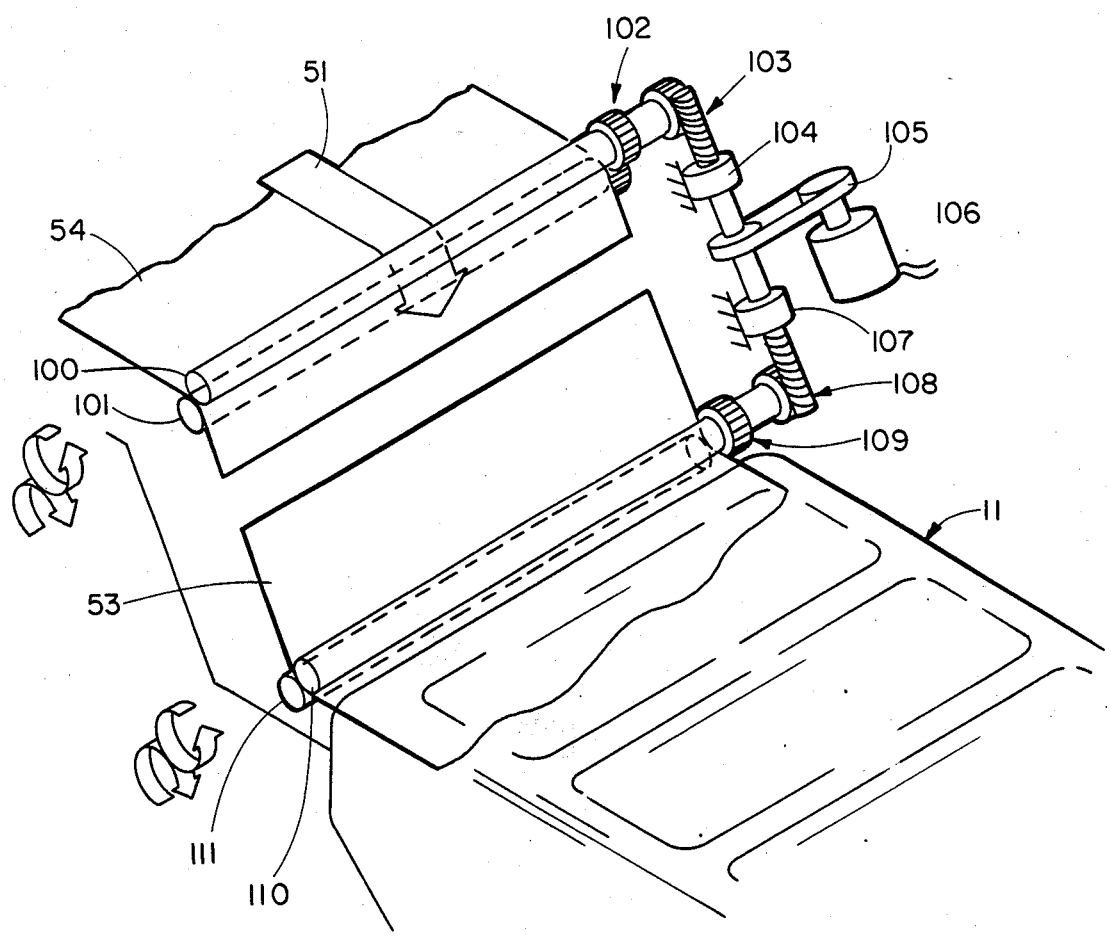
FIG. 3 is a three dimensional view taken from the general perspective indicates by the line 3—3 in FIG. 1 and shows another portion of the film transport apparatus.

Now, with FIGS. 1, 2 and 3 especially on mind attention will be directed to a continued description of the structure that makes up the single film sheet transport apparatus 50.

Adjacent and to the right of power driven roller set 63, 64 there is a solid film guide plate 77 which has spaced therefrom and parallel thereto a multiple appertured image boundry defining plate 76. The film path 51 passes between the solid guide plate 77 and the multiple appertured image boundry plate 76. The image boundry plate 76 is shown with three apertures 82, 83, 84 evidenced in dotted outline in FIG. 2.

The solid guide plate 77 has secured to its upper surface as seen in FIG. 2 a leading film edge detection switch 90 and a trailing film edge detection switch 92. The precise function and cooperative operation of the switches 90, 92 in respect of the other components in the system will be set forth in detail hereinafter.

A power driven roller set comprised of rollers 100, 101 is positioned to the right of the guide plate 77 and the apertured plate 76. The power driven rollers 100, 101 are mounted at an angle, as shown, in order that a film sheet secured between the rollers 100, 101 is delivered in a downward direction between exposed film guide plates 98, 99 and a final set of power driven rollers 110, 111. The final set of power driven rollers 110, 111 drivingly deliver the film sheets into the automatic film developer 11.

When FIG. 2 and FIG. 3 are studied in conjuction with one another it is readily apparent that a single electric motor 106 provides the power to operate the power driven roller sets 100, 101 and 110, 111 in much the same fashion as the single electric motor 71 provided power, as described earlier with respect to power driven roller set 63, 64 and the single power driven roller 52. Accordingly, with respect to roller sets 100, 101 the electric motor 106 provides power through belt and pulley arrangement 105, a third worm gear arrangement 103 and gear set 102.

The power driven roller set 110, 111 recieved power via the belt and pulley arrangement 105, fourth worm gear arrangement 108 and meshing gear set 109. Worm gear support bearings 62 and 104 are secured, in a manner as shown, to the frame 12.

FIG. 3 shows another novel feature of the invention in that there are shown two sheets of film 53 and 54 in a spaced apart relationship. The manner in which this separation is accomplished will be explained more fully hereinafter.

Reference is now made to FIGS. 1 and 7. In FIG. 1 there is shown centrally positioned a video monitor projection unit indicated generally by arrow 115. The structure and mechanical operation of the video projection unit 115 can best be understood by a study of FIGS. 7 and 7a in conjunction with the description that follows.

FIG. 7 is a three dimensional illustration of the video monitor projection unit 115, its propulsion mechanism (see FIG. 7a) and its cooperative relationship with a portion of the film transport apparatus described herein before.

In the review of FIG. 7 it is to be understood that in order to show and explain that which is illustrated the sizing of some components shown in the drawings are not to scale. Persons skilled in the photographic arts would be able to fabricate the invention without any undue experimentation given the principles of operation which will be detailed hereafter.

Beginning at the base of FIG. 7 there is shown in partial section a video monitor housing 116 having secured therein a video tube 117 on which video tube 117 appears one of a series of images to be recorded on a single sheet of film 53 near the top of the figure. Positioned beneath the video monitor housing 116 is a video projection carriage drive unit generally indicated by arrow 120. The carriage drive unit functions to cause this video projection unit to move intermittently in a reciprocating fashion at right angles to the film sheet path 51 (FIG. 1).

The video projection carriage drive unit 120, best seen in FIG. 7a, is comprised of a pair of pedestal support blocks 146, 147 which are secured to flooring in the base of the automatic photo imaging system 10 (FIG. 1). The video monitor housing 116 has integrally secured to its underside as shown a pair of drive support blocks 144, 145. Each of the pedestal support blocks 146, 147, as well as, the drive support blocks 144, 145 have three openings therethrough which recieve a pair of guide rods 148, 149. The guide rods 148, 149 are fastened by means not shown to the pedestal support blocks 146, 147 whereas the drive support blocks 144, 145 are free to slide in a reciprocating fashion in the direction indicated by a arrow 139. A drive shaft 142 drivingly coupled to an electric motor 140 via worm gear set 141 delivers a bidirectional input to the threaded portion 143 of the drive shaft 142. The drive support blocks 144, 145 are each provide with a threaded opening through which the threaded drive shaft drivingly cooperates. An adjustable mechanical stop 138 is an optional device and is shown secured to guide rod 149 to prevent over travel in a direction towards the electric motor 140.

Positioned above and secured to the video monitor housing 116, by means not shown, is a projection conduit which is made up of a lower elongated hollow conduit 118 which has an open end that matches the face of the video monitor tube 117. A vertically adjustable lid 119, which carries an upper elongated conduit 131 which is positioned over the lower elongated conduit 118. Slot and screw fasteners generally indicated by arrows 121, 122 allow for the relative movement of the vertically adjustable lid 119 in respect of the upper end of the lower elongated conduit 118. The adjustable feature allows an image focusing adjustment. A centrally disposed opening in the lid 119 is covered by a lens support plate which has at its center a lens 124 fastened thereto by means not shown. A shutter 126 is partially shown. The shutter 126 is remotely operated by a shutter actuation lever 127, which in turn is controlled by a solenoid 128 and the movement of the solenoid armature 129. It should be understood that the details of the shutter/lens arrangement 124/131 may be anyone of a number of commercially available lens/-shutter units. The only requirement is that the shutter is electrically actuated and remotely controlled.

The upper elongated conduit 131 has an open end 132 that is position adjacent the multiple apertured image boundry defining plate 76. The open end 132 forms the other end of the projection conduit which as has been noted is made up of lower elongated conduit 118, lid 119 and upper elongated conduit 131. The opening 132 matches each of the apertures 82, 83, 84 in the image boundry defining plate 76.

The operation of that portion of the system depicted in FIGS. 7 and 7a is quite straight forward. When a film sheet 53 is stopped in the film path at the position shown, there will be three unexposed portions of the film sheet 53 defined by the apertures 82, 83, 84 FIG. 6a. For purposes of this specification and the description of the invention as set forth in the claims appended hereto this row of unexposed film portion has been termed a "film exposure row".

The intermittent actuations of the electric motor 140 in the manner to be described more fully hereinafter with respect to FIGS. 11 and 12 results in the movement of the video monitor projection unit 115 such that the open end 132 of the upper elongated conduit 131 aligns itself sequentially with each of the apertures 82, 83, 84. Once alignment is present the remote actuation of the shutter/lens, 126/124 allows whatever image is present on the face of the video tube 117 to be projected onto the film sheet at one of the appertures thereby exposing the film and recording the image present on the screen of the video tube 117.

Figure 4:
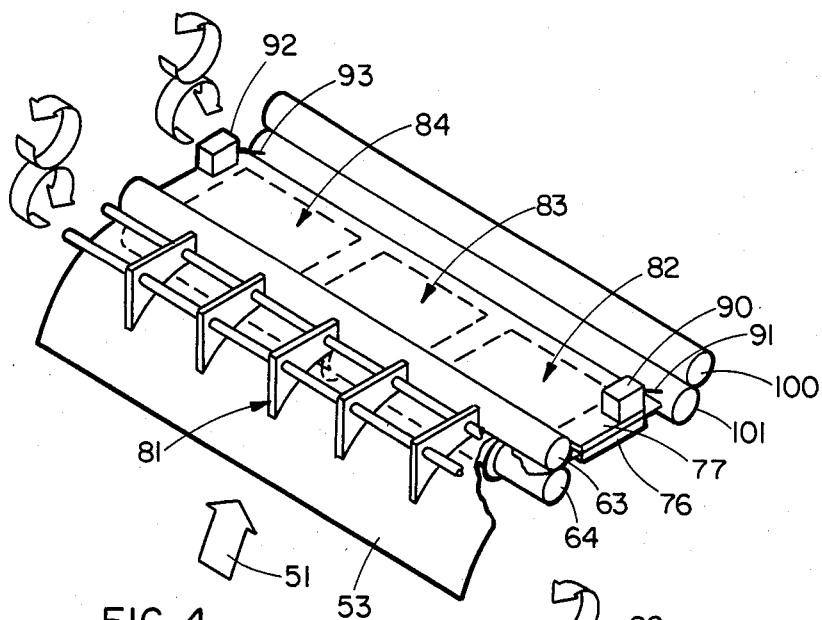
FIGS. 4, 5 and 6 are three dimensional illustrations of a film transport apparatus of the invention with film sheet(s) in various transported positions along a film path.
Figure 5:
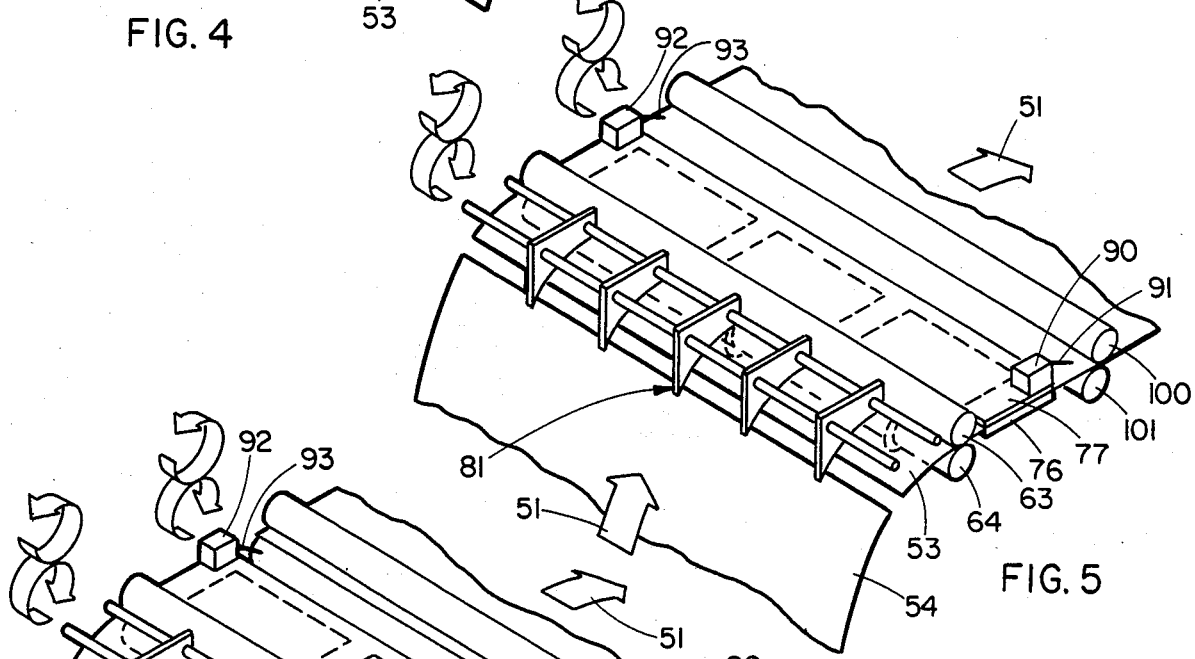
Figure 6:
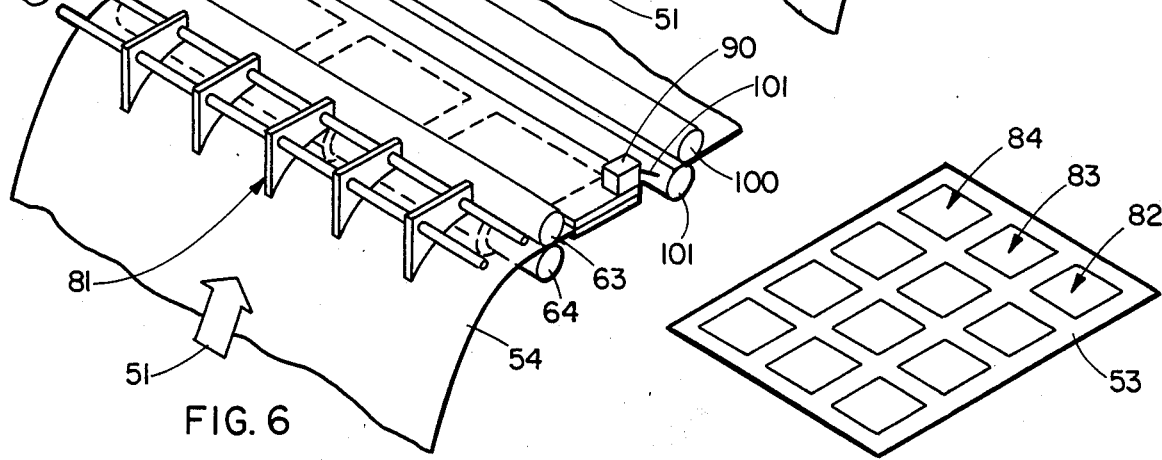

The precise movement of the film sheets by and through the film transport apparatus 50 will now be undertaken with specific attention directed to FIGS. 4, 5 and 6.

FIGS. 4, 5 and 6 are three dimensional illustrations of a portion of the film transport apparatus 50 of the invention with film sheets 53, 54 in various transported positions along the film path 51.

FIGS. 4, 5, and 6 are of a scale large enough to show more readily a number of structural details that are significant, but because of their relatively small size are not readily discernable in the other figures of the drawings.

The major components of the FIGS. 4, 5 and 6 are the film deflection guide 81; power driven roller pair 63, 64; multiple apertured film boundry defining plate 76; solid film guide plate 77; leading film edge detection switch 92; trailing film edge detection switch 90 and finally power driven roller pair 100, 101.

The switches 90 and 92 are connected by electrical wiring to a control unit 150, of FIG. 11, the operation of which will be described hereinafter. The switches 90 and 92 have feeler arms 91, 92 which are shown in FIG. 4 engaging the leading edge 55 of film sheet 53. Movement of the film sheet 53 causes its leading edge 55 to engage the feeler arms 91, 93 which results in movement of the feeler arms and actualion of the switches. At this point in the description it will be sufficient to indicate that when leading edge 55 of sheet 53 engages the feeler arm 91 of the leading film edge detection switch 90 a signal is delivered via the control unit 150 which cause the interuption of power to the electric motor 71 of FIG. 2 which results in the film sheet 53 stopping its movement along the film path 51. The film sheet 53 as shown in FIG. 4 is in a first film image exposure row position.

In FIG. 4 a portion of the film sheet 53 has been removed to show the details of an end portion of drive roller 64. The roller 64 is provided with a plurality of rubber like friction drive rings, one friction drive ring 69 is shown, with the remainder shown in dotted outline. The drive rollers 63 and drive roller 64 with its friction drive rings mutally frictionally engage the upper and lower surfaces of the film sheet 53. Power driven roller pairs 100, 101 and 110, 111 (FIGS. 1 and 3) although not shown in the drawings, are also provided with friction drive ring of the nature described with respect to drive roller 64 above.

FIG. 5 distinguishes itself over FIG. 4 in that there is shown single film sheet 53 followed in a spaced apart manner by single film sheet 54. In order to understand how the separation of the film sheets 53, 54 is accomplished it first must be understood that the diameters of the power drive rollers 63, 64 are larger than the diameter of power drive roller 52. Because the difference in roller diameter is on the magnitude of one-sixteenth of an inch the illustrations of FIGS. 1 and 2 which are of such a small scale that this difference in size is not discernable to the viewer of these figures.

With attention focused on FIG. 2 it will be appreciated that the power driven roller 52 and the power driven roller pair 63, 64 are driven simultaneously by the same motor 71 as explained earlier. In operation the power driven roller 52 is mounted for movement that intersects a surface of a single film sheet of the stacked single film sheets 27, FIG. 1. The power driven roller 52 is biased by spring 70 secured to the film deflection guide 81 and the pivot arm 58 (see FIG. 2) towards the surface of the top most sheet of film to thereby cause the single power driven roller 52 to frictionally engage the surface of the film sheet and cause the single film sheet 53 to slide upon the next sheet of film in the stack 27 and to be delivered into the film path 51.

The velocity of the film sheet 53 is initially determined by the rate of rotation of the power driven roller 52 and its diameter. When the film sheet 53 is engaged by power driven roller pair 63, 64 of a larger diameter than power driven roller 52, but driven at the same rotation rate as roller 52 the velocity of the film sheet 53 increases. This increase in velocity of the sheet 53 results in the film sheet 53 being drawn past the rotating power driven roller 52. The biasing force of the spring 70 and the attendent friction of the roller 52 on the film sheet is overcome by the power driven rollers 63, 64 and their frictional grasp on the film sheet.

Selection of the spring rate in respect of spring 70 and the angle the magazine 20 is to the film path is done in such a manner that the biasing force and resulting frictional engagement by the roller 52 on the photographic emulsion of the surface the film sheet results in no damage to the film.

It will be appreciated from the foregoing description that the power driven roller 52 remains in contact with the film sheet 53 until the power driven roller pair 63, 64 have drawn the film sheet completely free of the magazine 20 after the film sheet has made a series of stops along the film path for purposes of exposing additional images. Once the film sheet 53 is free of the magazine 20 the power driven roller 52 frictionally engages the next sheet of film, here indicated as film sheet 54. Because film sheet 53 is moving faster than film sheet 54 the desired separation between film sheets 53, 54 is accomplished.

Reference is now made to FIG. 6 which shows film sheet 53 having been transported by the joint action of power driven roller pairs 63, 64 and 100, 101 to a point where the film sheet 53 is no longer experiencing the driving force of roller 63, 64. The trailing edge 65 of film sheet 53 has just been moved past feeler arm 93 of trailing film edge detection switch 92 which results in switch 92 sending a signal to control unit 150 to cause the electric motor 106 (FIGS. 2 and 3) to continue driving the power driven roller pairs 100, 101 and 110, 111 to thereby drivingly deliver the film sheet 53 into the automatic developer 11 (FIG. 1) at a predetermined speed.

Figure 6A:
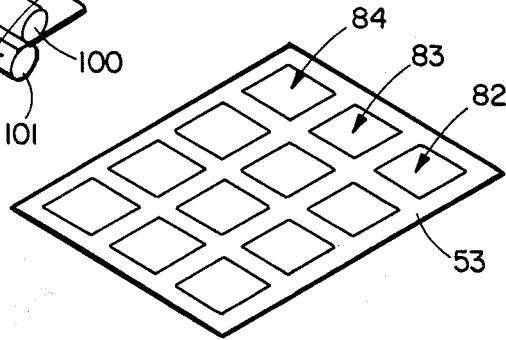
FIG. 6a illustrates a fully exposed film sheet.

FIG. 6a is intended to illustrate a fully exposed film sheet 53 wherein there is shown the first film image row with images 82, 83, 84 identified by reference numerals and arrows.

Reference is now made to FIGS. 8, 9 and 10 which illustrate in three dimensional form the multi sheet film magazine 20 in various operative states.

In FIG. 8 the multiple film magazine 20 is shown as a sealed flat rectangular shaped cannister 21 having an upper surface 22 (FIG. 9) with sides 23, 24.

The sides 23, 24 have a cut away portion as shown and indicated by reference arrow 26. A "U" shaped reciprocating shield 28 is mounted over the canister 21 upper surface 22 and sides 23, 24 as shown.

A guide slot 34 in the reciprocating shield 28 cooperates with a pin 36 secured to the side of the cannister 21. The canister 21 is provided with an elongated door 31 secured to the cannister as shown by a hinge 29. Integrally secured to the elongated door 31 for movement therewith are cam elements 32, 33. A spring 37 is secured at one end by pin 39 to side 23 and at its other end to the corner 38 of the elongated door 31.

Centrally disposed on the upper surface 22 of the cannister 21 is a latch 46 that is intended to cooperate with an upstanding plate 41 which is integrally secured to the U-shaped reciprocating shield 28 when the sheild is moved into the position shown in FIG. 9. A guide rod 42 passes through the upstanding plate 41 as shown and is secured via a guide support element 42 to the upper surface 22 of the cannister 21. A spring 44 disposed around the guide rod 42 and between the support element 43 and upstanding plate 41 operates to bias the reciprocating shield to a closed position when the latch 46 is released.

It will be recalled with respect to the description of FIG. 1 that the multiple film sheet magazine 20 with cam elements 32, 33 (FIG. 8) when inserted through door opening 17 in the cabinet 70 engage cam slots 15, 16. As the magazine 20 is manually loaded into the automatic photo imaging system 10 the cam elements 32, 33 move up the slots 15, 16 until the magazine 20 is in the position shown in FIG. 1. At that point in time the magazine will be in the open position shown in FIG. 9 with multi-film sheet stack 27 positioned to recieve upon its upper surface the power driven roller 52 as is shown in FIG. 10.

Figure 11:
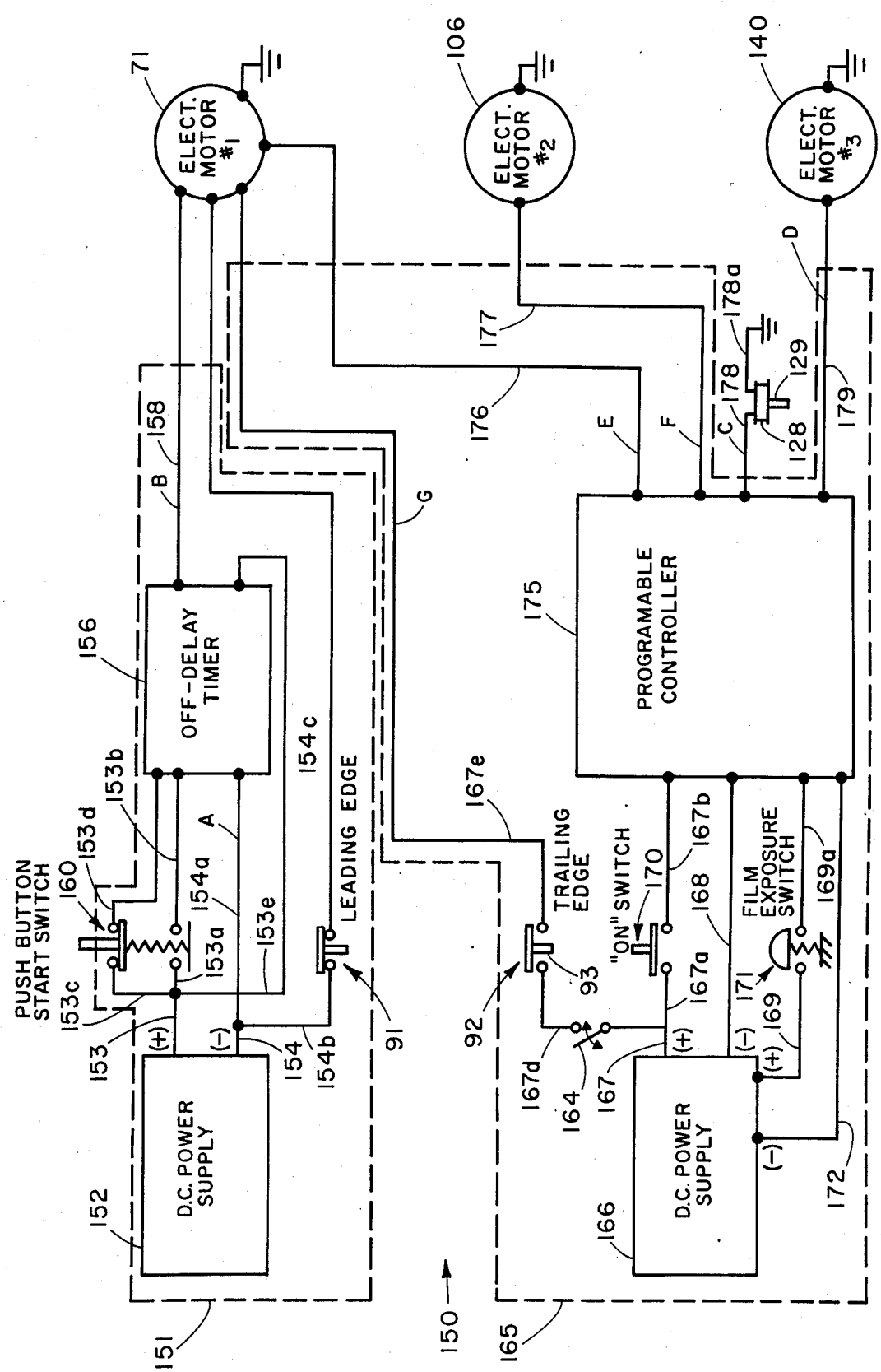
FIG. 11 is a block diagram of a control unit employed in the practice of the inventor.
Figure 12:
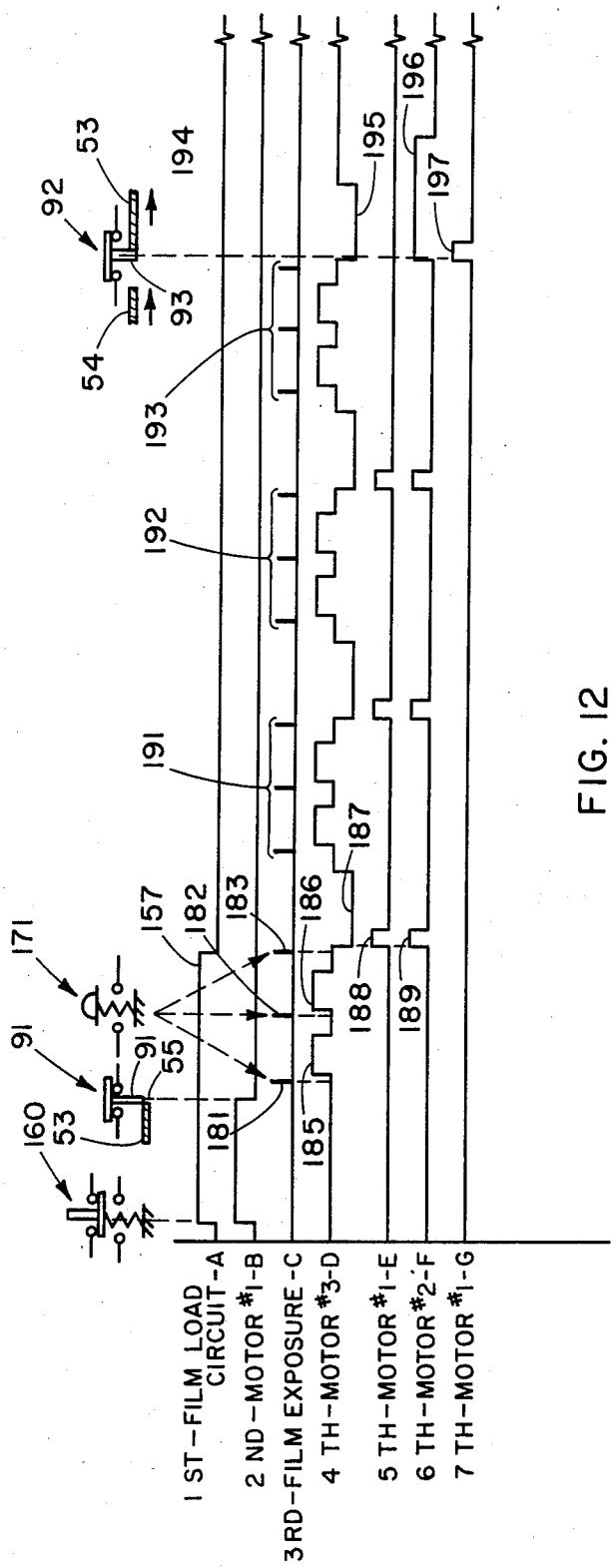
FIG. 12 is a timing chart that illustrates the varion "ON"/"OFF" states that arise as a consequence of the operation of the control unit of FIG. 11.

Reference is now made FIGS. 11 and 12 which when studied in conjunction with each other in the light of the description that follows will provide the reader with a full understanding of the dynamic operation of the system.

FIG. 11 is a block diagram of the systems control unit 150 which is employed in the practice of the invention. The control unit is comprised of a film load circuit 151 and automated film advance and exposure circuit 165 both of which are shown in dotted outline.

The film load circuit 151 is shown electrically coupled via leads 154c, 157 to electric motor number 1 which represents film transport motor 71 in the other figures.

The automatic film advance and exposure circuit 165 is electrically coupled via lead 176 to motor number 1; via lead 177 to motor number 2, i.e. film transport motor 106 and via lead 179 to Motor No. 3, i.e. video unit propulsion motor 140. Motors 71, 106 and 140 are each connected to ground as is indicated in FIG. 11.

The automated film advance and exposure circuit 165 is additionally electrically coupled to the lens/shutter solenoid 128 via 178.

In the description that follows concerning FIG. 11 it should be observed that reference characters A, B, C, D, E, F and G are used to designate various electrical leads. In FIG. 12 the corresponsing reference characters are employed to indicate signals present on the identified leads of FIG. 11.

The film load circuit 151 operates in the following manner. The film load circuit 151 is provided with a spring biased push button start switch 160 which is depressed after the multiple film sheet magazine 20 has been loaded into the system 10 as heretofore described. The depression of start switch 160 completes a circuit from a positive terminal of D.C. power supply 152 via lead 153, lower contacts of switch 160, lead 153b, "OFF" delay timer 156, lead 154a negative terminal on the D.C. power supply 152. This action triggers "ON" the "OFF" delay timer 156. When the push button start switch 160 is released power is maintained to the timer 156 via lead 153 from the D.C. power supply 152, lead 153c, upper contacts of switch 160, lead 153d, "OFF" delay timer 156, and lead 154a to power supply 152.

This timer "ON" condition is indicated by reference numeral 158 in FIG. 12. For reasons that will become more evident the "OFF" delay timer must remain on for a period of time of sufficient length to allow the first film sheet e.g. sheet 53 to be delivered up out of the magazine 20 and to and through power driven rollers 63, 64 to the first film image exposure row position described earlier. This "OFF" delay timer 156 is conventional in nature and the following identified timer is well suited for use in the invention: Potter & Brumfield CHB-38-70012.

The turning "ON" of the timer 156, as just noted i.e. curve 158, simultaneously effects the provision of power to Motor No. 1 via the following circuit; lead 153 from a positive terminal on power supply 152, lead 153e, timer 156, lead 158, Motor No. 1, lead 154c, normally closed switch 91, lead 154b and lead 154 to a negative terminal on power supply 152. This "motor on" condition is indicated by reference numeral 159 on the 2nd line of FIG. 12.

Motor No. 1 is turned off when the leading edge 55 of film sheet 53 strikes feeler arm 91 of leading edge switch 91 (see FIGS. 4 & 12). The first sheet of film 53 is now loaded into the first film image row position and if nothing further is done the film load circuit 151 and its "ON" condition shown in the 1st line of FIG. 12 will turn-off as shown, after whatever time the "Off" delay timer 156 has been set for.

Central to the operation of the automated film advance and exposure circuit 165 is the programable controller 175 which is a commercially available circuit manufactured by Relliance Electric Company of Stone Mountain, GA and designated "Auto-Mate 15".

The "Auto-Mate 15" is designed to operate multiple electrical motors under the instructions of a program. The programable controller 175 i.e. "Auto-Mate 15" and the program that causes the motors 71, 106, 140 and solenoid 128 to operate are not unique. In fact any number of programs could be written to cause the turning "ON" and "OFF" of motors and solenoid just noted. The only criterion that the program is required to accomplish is evidence in the timing chart of FIG. 12. It is submitted that any individual with average skill in the art with the timing chart of FIG. 12 before him could write a program to perform the "ON"-"OFF" Functions of FIG. 12.

Attention is now directed to the operation of the automated film advance and exposure circuit 165 of FIG. 11 as indicated by the 3rd through 7th lines of the timing chart of FIG. 12.

It is to be understood that when the automatic photo imaging system 10 (FIG. 1) is innitially setup the video monitor projection unit 115 is positioned with projection conduit end having openning 132 positioned adjacent apperture 82 (see FIG. 7).

Although not illustrated in the drawings it should be understood that the operator of the system has visually available a remote video monitor on which there appears the same image that is present on video monitor tube 117 (see FIG. 1 or FIG. 7).

In the event that the image on the remote video monitor is of appropriate clarity and content, the system operator will innitiate the energization of the programable controller 175 by depressing "ON" switch 170 which completes a circuit from a positive terminal of D.C. power supply 166 via lead 167, 167a, switch contacts of switch 170 and lead 167b to the programable controller 175. The controller 175 is electrically connected via lead 168 to a negative terminal on the D.C. power supply 166. The "ON" condition of the programable controller 175 is not depicted in FIG. 12.

In order to capture the image on the video monitor tube 117 in the film sheet 53 as image 82 the operator need only depress film exposure switch 171. The momentary closing of the film exposure switch 171 results in the positive "on" pulse spike signal 181 indicated by pulse train shown on the 3rd line of FIG. 12. This pulse spike signal 181 appears on lead 178 from the controller 175. The pulse spike signal 181 causes the completion of a circuit via lead 178, solenoid 178, and lead 178a to ground. This just described completed circuit causes the solenoid 128 with its moveable armature 129 to actuate the lens 124/shutter 126 arrangement to cause the recordation of image 82 on the film sheet 53.

It should be evident that each time the film exposure switch 171 is depressed, "on" pulsed spike signals such as 182, 183 are generated by the controller 175 with the attendant recordation respectively of film images 83 and 84 on the film sheet 53.

The manner in which the video monitor projection unit 115 is incrementally moved to position the video projection conduit adjacent the apertures of the multiple appertured image boundry defining plate 76 to allow the formation of images 83 and 84, followed by return of the video monitor projection unit 115 to its innitial position while film sheet 53 is advanced to the next film exposure row, will now be undertaken.

It will be recalled that the operation of electric motor 140 (FIG. 7a and FIG. 11) causes the video projection unit 115 to be propelled back and forth in a direction that is at right angles to film sheet path 51. The duration of time the motor 140 is on, as well as the polarity of the signal recieved by the motor determines the distance traveled and direction of travel of the video projection unit 115.

The nature of the program that controls motor energization is such that the moment that the solenoid 128 is activated the program next causes the energization of motor 140 i.e. Motor No. 3 in FIG. 11. The actuation of motor 140 is evidenced by motor "ON" pulse 185 as shown in the 4th line of FIG. 12. The time duration of motor "ON" pulse 185 is sufficient to cause the motor 140 to turn a precise number of revolutions and thereby bring the projection conduit opening 132 into exact registration with the second apperture in apperture plate 76 that defines image 83.

It should be recognized that the timming chart of FIG. 12 illustrates a sequence of events in what appears to be a fairly ridged timing sequence between controlled events i.e. film exposure, video monitor projection unit propulsion etc. In actual practice the real time between these events may be measured in seconds, minutes, hours or days. The graphic illustration of FIG. 12 is intended to merely convey in the least space the total automated functions of the system.

The depression of film exposure switch 171a second time results in the generation of "on" pulse spike signal 182, the capturing of image 83 on film sheet 53 followed by motor "on" pulse 186 to advance the video projection unit to the next aperture.

Once the third image 84 has been captured on the film sheet 53 as a result of the activation of film exposure switch 171 and the generation of "ON" spike pulse 183, the controllers program causes the generation of a reversed polarity signal pulse 187. The reversed polarity signal pulse 187 causes motor 140 to reverse direction and bring the video projection unit back to its initial position.

It is to be noted that simultaneously with the appearance of the reversed polarity signal pulse 187, the controller program causes motors 71 and 106 to operate and thereby advance the film sheet to the next film exposure row. Motor "ON" pulse signals 188 and 189 shown on the 5th and 6th lines of FIG. 12 represent the electrical signals that appear respectively on leads 176, 177 from controller 175 to motors 71 and 106, i.e. motors Nos. 1 and 2 as referred to in FIGS. 11, 12.

To the right of "ON" pulse spike signals 181, 182, 183 are depicted three other sets of "ON" pulse spike signals 191, 192 and 193. The programable controller 17 responds to control motors 140, and 71, 106 in the same fashion described earlier with respect to "ON" pulse spike signals 181, 182, 183. There is however an operating distinction that arises at the end of "ON" pulse spike signal set 193, in that completion of the exposure of the film image in the last row of images, ie. image 85 FIG. 6a heralds completion of all photo images on the film sheet 53 whereupon the film sheet 53 must be driven separately into the automatic film processor at a speed that is compatible with film processing speed of the automatic film developer 11. At the same time the next film sheet 54 on the film sheet path 51, which film sheet is spaced apart and behind the film sheet 53, must be driven into a first film exposure row position in order that the automated photo imaging process of the invention continue.

Attention is directed to the 4th, 6th and 7th lines of FIG. 12 wherein it will be noted that the programed controller 175 provides three signals, represented by negative pulse 195 and positive motor "on" pulses 196, 197.

Depicted above the 1st line of FIG. 12 and connected by a broken line 194 is trailing film edge detection switch 92. The trailing film edge detection switch 92 is shown in FIG. 11 as part of an electrical circuit that permits the delivery of power from the D.C. power source 166 via leads 167, 167c, enabling switch 164, lead 167d, the contacts of switch 92 and lead 167e to motor 71. With the enabling switch 164 closed and the film sheet 53 in passage, the trailing film edge detection switch 92 is open. As the trailing film edge 65 (FIG. 6) passes out from under the feeler contact 93 of the switch 92, the just described circuit is completed and the motor 71 drives film sheet 54 into contact with the feeler contact 93 which interrupts power to the motor 71 and stops film sheet 54 movement. The system is now ready to begin the automated photo imaging process again.

It should be understood that the invention has been described in an enabling environment that is suceptible to modification without departing from the spirit and scope of the invention. For example, but not by way of limitation the programable controller 175 may be readily programed to provide any number of combinations of film advance and video monitor projection unit movements.

Note additionally that while the preformed embodiment of the invention contemplates as shown single button switch operation the invention completes as being within its purview multiple button switch operation to thereby facilitate the random placement of images on the film sheet.

Although this invention has been illustrated and described in connection with the particular embodiment illustrated, it will be apparent to those skilled in the art that various changes may be made therein without departing from the spirit of inventions as set forth in the appended claims.

I claim:

1. An automatic multi photo imaging system employing multiple single sheet film, said system comprising
   a single sheet film transport means operative to receive single sheets of film and mechanically deliver said single sheet along a film sheet path to a first film image exposure row position, said image exposure row being at right angles to said film path,
   said film transport means further having means to detect an arrival of said film sheet when said film sheet is adjacent said first film image exposure row position and to stop said film sheet movement along said path,
   a video monitor projector means mounted for movement at right angles to said film sheet path, said projector means including a video monitor tube coupled by a projection conduit having one open end secured to said video monitor and configured to match said video monitor, said conduit having the other open end positioned immediately adjacent said film path, said other open end configured to match the boundries of an image to be projected upon said film.
   said projection conduit having therein a remote, shutter controlled single lens,
   said video projection means having driving means to move said projection means incrementally back and forth across said film sheet in a single degree of freedom path to thereby establish a first row of images across said film sheet upon the actuation of said remote shutter controlled single lens at each incremental movement of said video projection means,
   said transport means including means to advance said film sheet along said filmsheet path to thereby present said conduit other open end to unexposed film and thereby establish another row of possible images across said sheet of film by the use of said single lens moveable in said single degree freedom path,
   said single sheet film transport means including multiple apertured image boundry defining means positioned between said video monitor projection means remote open end and said film sheet when said film sheet is at said first film image exposure row position,
   said remote conduit opening configuration matching said aperatures in said image boundry defining means to thereby ensure precisely defined image formation on said film as said video monitor projector means incrementally moves from apperture to apperture in said image boundry defining means.

2. The automatic photo imagery system of claim 1, wherein said system includes in combination multiple film sheet magazine means positioned to present a supply of single sheet film to said single sheet film transport means.

3. The automatic photo imagery system of claim 2 wherein said multiple film sheet magazine means is comprised of invididual single sheet film supplies of different sizes.

4. The automatic photo imagery system of claim 2 wherein said film transport means includes power driven roller means which cooperate with said single film sheet to cause said single film sheet to be mechanically transported from said multiple film sheet magazine means along said single sheet film path,
  said power driven roller means having a single power driven means in driving contact with said single film sheet in said muliple film sheet magazine means and a pair of power driven roller means between which said single film sheet is delivered and then driven along said film sheet path.

5. The automatic photo imagery system of claim 4 wherein said single power driven roller means and said pair of power driven roller means are driven simultaneously by a common rotary power drive motor,
  each said pair of power driven roller means having a roller diameter that is larger than said single power driven roller diameter means to thereby ensure that said single film sheet velocity is increased when a single film sheet is only under the driving influence of said pair of power driven roller means whereupon said single film sheets are caused to be separated along said film path as a function of the difference in roller diameters of said single power driven roller and said pair of power driven rollers.

6. The automatic photo imagery system of claim 5 wherein said single film sheets are in a stacked arrangement in said magazine and said single power driven roller means is mounted for movement along a line that intersects a surface of a single film sheet of said stacked single film sheets, said single power driven roller means being biased towards said surface of said single sheet to thereby cause said single power driven roller means to functionally engage said surface of said single film sheet and cause said single film sheet to slide upon the next single film sheet in said stack and be delivered into said film path.

7. The automatic photo imagery system of claim 6, wherein said multiple single film sheet magazine position and consequently said stack of film is located at a load angle to said film path when said film path is coincident with said film sheet and said film sheet is in a film exposure row position.

8. The automatic photo imagery system of claim 7 wherein said load angle is between 0° and 45°, said angle measured from a line perpendicular to a plane containing a portion of said single film sheet when said portion of said single sheet is in said image exposure row position.

9. The automatic photo imagery system of claim 8 wherein there is provide a film sheet deflection means positioned such that single film sheets mechanically being delivered by said single power roller means encounter said deflection means and are deflected such that a leading edge of said single film sheet enters between said pair of power driven rollers.

10. The automatic photo imagery system of claim 9 wherein said single sheet film transport means includes control means coupled to a film sheet arrival detection means and a film sheet departure detection means,
  said film sheet arrival and departure detection means positioned adjacent said film sheet path at said film exposure row position,
  said control means aperative to respond to the detection of said film sheet arrival and thereby ensure the actuation of said remote shutter controlled single lens at each incremental movement of said video projection means only when said single film sheet is at said exposure row position and presents exposed film to said video projection monitoring means,
  said control means aperative to respond to the detection of said film sheet departure detection mean to cause a exposed film power driven film sheet.

11. The automatic photo imagery system of claim 10 wherein said system includes an automatic film developing means which receives and drivingly deliveries exposed film sheet.

12. A multiple, single sheet film handling apparatus and system that provides multiple automatic photo imaging on a single film sheet while additionally automatically providing developed multiple images on a single sheet of film, said apparatus and system comprising.
  a multiple film sheet magazine means,
  a single sheet film transport means operatively coupled to said multiple film sheet magazine means to mechanically deliver a single sheet of film along a film sheet path from said magazine means to a position adjacent a multiple apertured image boundry defining means positioned at right angles to said film sheet path,
  said film transport means having means to detect the arrival of a leading edge of said film sheet along said film sheet path when said film sheet is adjacent said image boundry defining means and to cause said film sheet to stop its movement along said path,
  a video monitor projector means mounted for movement at right angles to said film sheet, said projector means including a video monitor tube coupled by a projection conduit having one open end secured to said video monitor and configured to match said video monitor, said conduit having the other open end positioned adjacent said image boundry defining means, said other open end configured to match said apetures in said image boundry defining means,
  said projection conduit having therein a remote shutter controlled lens, which shutter operates only when said other open conduit end is directly adjacent, in matching relationship an aperture of said image boundry defining means,
  said video monitor projection means having driving means to move said projection means incrementally from aperture to aperture and back in a single degree of freedom path to thereby establish across said film sheet a row of descrete images,
  said film transport means including means to advance said film sheet a predetermined distance and then stop, said distance sufficient to deliver unexposed film to a position coincident with said image boundry defining means and thereby establish another row of possible images across said sheet of film,
  said transport means having means to detect the passage of a trailing edge of said film sheet and the completion of a last row of images on said film as well as cause another single film sheet to be delivered by said transport means from said magazine means, said film sheet is mechanically driven into an automatic film developing means.

13. The automatic photo imagery system of claim 12, wherein said system includes in combination more than one multiple film sheet magazine means positioned to present a supply of single sheet film to said single sheet film transport means.

14. The automatic photo imagery system of claim 13 wherein said multiple film sheet magazine means is comprised of individual single sheet film supply magazines of different sizes.

15. The automatic photo imagery system of claim 13 wherein said film transport means includes power driven roller means which cooperate with said single film sheet to cause said single film sheet to be mechanically transported from said multiple film sheet magazine means along said single sheet film path, said power driven roller means having a single power driven means in driving contact with said single film sheet in said muliple film sheet magazine means and a pair of power driven roller means between which said single film sheet is delivered and then driven along said film sheet path.

16. The automatic photo imagery system of claim 15 wherein said single power driven roller means and said pair of power driven roller means are driven simultaneously by a common rotary power drive motor, each said pair of power driven roller means having a roller diameter that is larger than the diameter of said single power driven roller means to thereby ensure that said single film sheet velocity is increased when a single film sheet is under the driving influence of said pair of power driven roller means whereupon said single film sheets are caused to be separated along said film path as a function of the difference in roller diameters of said single power driven roller and said pair of power driven rollers.

17. The automatic photo imagery system of claim 16 wherein said single film sheets are in a stacked arrangement in said magazine and said single power driven roller means is mounted for movement along a line that intersects a surface of a single film sheet of said stacked single film sheets, said single power driven roller means being biased towards said surface of said single sheet to thereby cause said single power driven roller means to functionally engage said surface of said single film sheet and cause said single film sheet to slide upon the next single film sheet in said stack and be delivered into said film path.

18. The automatic photo imagery system of claim 17, wherein said multiple single film sheet magazine position and consequently said stack of film is located at a load angle to said film path when said film path is coincident with said film sheet and said film sheet is in a film exposure row position.

19. The automatic photo imagery system of claim 18 wherein said load angle is between 0° and 45°, said angle measured from a line perpendicular to a plane containing a portion of said single film sheet when said portion of said single sheet is in said image exposure row position.

20. The automatic photo imagery system of claim 19 wherein there is provide a film sheet deflection means positioned such that single film sheets mechanically being delivered by said single power roller means encounter said deflection means and are deflected such that a leading edge of said single film sheet enters between said pair of power driven rollers.

21. The automatic photo imagery system of claim 20 wherein said single sheet film transport means includes control means coupled to said film sheet arrival detection means and said film sheet departure detection means.

* * * * *